(No Model.)
A. MURRAY.
WAGON BRAKE.
No. 279,974. Patented June 26, 1883.
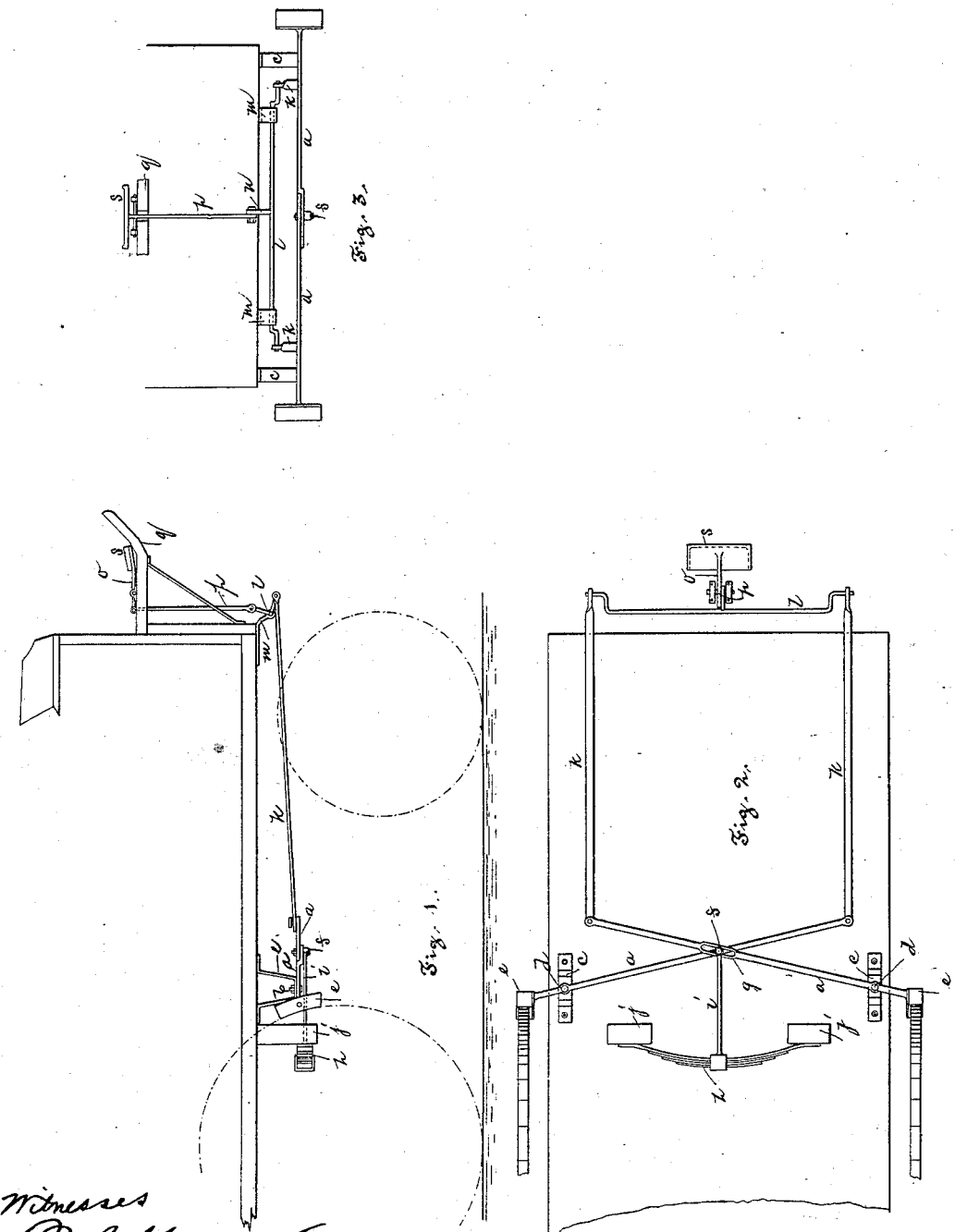
Witnesses
D. J. Morgan
S. H. Morgan
Andrew Murray
Inventor
By A. P. Thayer, atty

UNITED STATES PATENT OFFICE.

ANDREW MURRAY, OF STAMFORD, CONNECTICUT.

WAGON-BRAKE.

SPECIFICATION forming part of Letters Patent No. 279,974, dated June 26, 1883.

Application filed March 27, 1883. (No model.)

*To all whom it may concern:*

Be it known that I, ANDREW MURRAY, a citizen of the United States, and residing at Stamford, Fairfield county, Connecticut, have invented new and useful Improvements in Wagon-Brakes, of which the following is a specification.

My invention consists of a simple and efficient arrangement of brake-levers, and apparatus connecting them with a foot-lever located on the foot-board of the truck, by which the power is transmitted from the foot-lever by a tension-rod to a crank-shaft at the front end of the wagon-bed, and thence to the brake-levers by other tension-rods, and being so arranged that a short movement of the foot-lever effects the necessary range or length of movement of the brakes to the wheels, and also enables the operator to easily apply all the force required for braking the largest trucks under any conditions of ordinary use, as hereinafter fully described, reference being made to the accompanying drawings, in which—

Figure 1 is a side elevation of part of a truck with my improved brake applied to it. Fig. 2 is a plan of the bed or platform of the truck inverted, and Fig. 3 is an end elevation.

I propose to arrange a couple of brake-levers, $a$, one for each wheel, on pivots $b$, near the respective edges of the platform, and in suitable hangers, $c$, attached to the under side of the platform to support the levers at the proper height with relation to the wheels, the said levers having the brake-shoes $e$ on the ends of their short arms and in suitable proximity to the wheels, while the long arms extend nearly across the bed, crossing each other at the center of the platform, and being connected together thereat by a stud-pin $f$, in one, passing through a slot, $g$, in the other, and both being also connected thereat to a backing-off spring, $h$, by a rod, $i$, the said rod being connected to the stud-pin $f$, and also to the spring, which is of semi-elliptic form, and is connected to the platform by its ends being attached to the strong brackets $j$, secured to and projecting down from the platform. The long arms of the brake-levers are respectively connected by pull-rods $k$ with the ends of a crank-shaft, $l$, located at and a little below the front end of the platform in bearings $m$, attached to it, the said shaft extending along the breadth of the platform a distance equal to that between the ends of the long arms of the levers $d$, in order that the rods $k$ may work at right angles to the cranks and parallel to each other for the best operation, and at or about the center said crank-shaft has an arm, $n$, set at right angles to the cranks, and connected with the short arm of the foot-lever $o$ by the rod $p$, extending upward from said shaft to the foot-board $q$, whereon the foot-lever is pivoted, and is so arranged by the extension of the long arm, having the foot-piece $s$, to the place on the foot-board where the feet naturally rest, that the most powerful efforts of the driver may be easily brought to bear on it.

In Fig. 1 the foot-lever is represented as being pressed down to apply the brakes, from which position it will be raised to the extent of its range, when the pressure is removed and the backing-off spring is allowed to act.

It will be seen that with the exception of the short arms of the brake-levers $a$, and for a short distance from pivots $d$ along the long arms, all the apparatus may be made very light, and at the same time will have ample strength for the application of the power and for durability and wear. The arrangement of the spring for backing off the brakes is calculated to be very efficient and durable, at the same time being very simple to make.

What I claim, and desire to secure by Letters Patent, is—

1. The brake-levers $a$, pivoted to the brackets $c$, near the edges of the platform, and crossing each other and being connected together and to the spring $h$ at the middle of the platform, also being connected by their long arms and rods $k$ with the double-cranked shaft $l$, located at the front of the platform and connected with the foot-lever located on and pivoted to the foot-board, substantially as described.

2. The backing-off-spring apparatus consisting of the semi-elliptic spring $h$, attached at its ends to the brackets $j$, and being connected at the middle to the crossed and connected brake-levers $a$ by the rod $i$ and stud-pin $f$, substantially as described.

In witness whereof I have hereunto signed my name in the presence of two subscribing witnesses.

ANDREW MURRAY.

Witnesses:
EDWARD MALONE,
GEORGE R. FAUCETT.